United States Patent
Satarino et al.

(10) Patent No.: US 11,255,303 B2
(45) Date of Patent: Feb. 22, 2022

(54) INLINE HIGH FREQUENCY FIBER SILENCER

(71) Applicant: Toledo Molding & Die, LLC, Toledo, OH (US)

(72) Inventors: Charles David Satarino, Milan, MI (US); Karthik Jayakumar, Canton, MI (US); Erich James Vorenkamp, Pinckney, MI (US); Neville Jimmy Bugli, Novi, MI (US)

(73) Assignee: Toledo Molding & Die, LLC, Toledo, OH (US)

( * ) Notice: Subject to any disclaimer, the term of this patent is extended or adjusted under 35 U.S.C. 154(b) by 81 days.

(21) Appl. No.: 16/748,287

(22) Filed: Jan. 21, 2020

(65) Prior Publication Data

US 2020/0232429 A1     Jul. 23, 2020

Related U.S. Application Data

(60) Provisional application No. 62/794,848, filed on Jan. 21, 2019.

(51) Int. Cl.
- *F02M 35/12* (2006.01)
- *G10K 11/162* (2006.01)
- *F02M 35/10* (2006.01)

(52) U.S. Cl.
CPC .. *F02M 35/1255* (2013.01); *F02M 35/10262* (2013.01); *F02M 35/1266* (2013.01); *F02M 35/1272* (2013.01); *F02M 35/1283* (2013.01); *G10K 11/162* (2013.01)

(58) Field of Classification Search
None
See application file for complete search history.

(56) References Cited

U.S. PATENT DOCUMENTS

| | | | |
|---|---|---|---|
| 2,311,676 A | 2/1943 | Maxim | |
| 3,019,850 A * | 2/1962 | March | F16L 55/02754 181/224 |
| 3,712,416 A | 1/1973 | Swanson et al. | |
| 3,966,014 A | 6/1976 | Gowing | |
| RE30,306 E | 6/1980 | Moore et al. | |
| 4,782,912 A | 11/1988 | Wandless | |
| 5,302,783 A * | 4/1994 | Sadr | F01N 1/006 181/243 |

(Continued)

FOREIGN PATENT DOCUMENTS

| | | | |
|---|---|---|---|
| DE | 3608804 | 9/1987 | |
| DE | 10026355 A1 * | 1/2002 | F02M 35/1283 |

(Continued)

*Primary Examiner* — Michael A Kessler
(74) *Attorney, Agent, or Firm* — McHale & Slavin, P.A.

(57) ABSTRACT

A high frequency attenuating device for an air flow induction system of a vehicle employing a thermoformed fibrous mat of any shape that fits robustly inside the duct. The dissipative nature of the fibrous mat helps in achieving broadband attenuation in the high frequency regime. The ability to manufacture the fibrous mat into any shape helps with restriction, targets different attenuation bands, and makes it more feasible to manufacture. Hybrid solutions are possible when combined with low frequency perforated silencers or high frequency QWT arrays injection molded onto them.

12 Claims, 3 Drawing Sheets

(56) References Cited

U.S. PATENT DOCUMENTS

| | | | |
|---|---|---|---|
| 5,548,093 A * | 8/1996 | Sato | F16L 11/118 |
| | | | 138/121 |
| 5,572,966 A | 11/1996 | Doddy et al. | |
| 6,758,304 B1 | 7/2004 | MacLean | |
| 6,802,388 B2 | 10/2004 | Wolf | |
| 6,915,876 B2 | 7/2005 | Ciray | |
| 7,055,484 B2 | 6/2006 | Marks et al. | |
| 7,497,300 B2 | 3/2009 | D'Angelo | |
| 7,549,508 B2 | 6/2009 | Okawara et al. | |
| 7,631,726 B2 | 12/2009 | McWilliam et al. | |
| 7,832,524 B2 | 11/2010 | Mueller et al. | |
| 7,934,582 B2 | 5/2011 | O'Malley et al. | |
| 7,967,106 B2 | 6/2011 | Ross et al. | |
| 8,066,096 B1 | 11/2011 | Francisco et al. | |
| 8,087,493 B2 | 1/2012 | Kempf et al. | |
| 8,360,199 B2 | 1/2013 | Miller | |
| 8,439,013 B2 * | 5/2013 | Bellis | F02M 35/02 |
| | | | 123/434 |
| 8,550,057 B2 | 10/2013 | Prior | |
| 8,684,132 B2 | 4/2014 | Muller et al. | |
| 8,776,755 B2 | 7/2014 | Muller et al. | |
| 8,807,274 B2 | 8/2014 | Muller et al. | |
| 9,291,131 B2 | 3/2016 | Nishio | |
| 9,366,173 B2 | 6/2016 | Mah et al. | |
| 9,587,535 B2 | 3/2017 | Williams et al. | |
| 9,784,218 B1 | 10/2017 | Waisanen | |
| 2003/0072459 A1 * | 4/2003 | Cole | B29C 45/006 |
| | | | 381/71.7 |
| 2004/0118387 A1 * | 6/2004 | Lawrence | F02M 25/08 |
| | | | 123/518 |
| 2004/0159298 A1 * | 8/2004 | Ino | F02M 35/10354 |
| | | | 123/184.21 |
| 2006/0272888 A1 | 12/2006 | Lucas et al. | |
| 2009/0314241 A1 | 12/2009 | Koss et al. | |
| 2010/0193282 A1 | 8/2010 | Kim et al. | |
| 2011/0073406 A1 | 3/2011 | Ortman et al. | |
| 2011/0074067 A1 | 3/2011 | Khami et al. | |
| 2013/0047960 A1 * | 2/2013 | Yamamoto | F02M 35/10281 |
| | | | 123/445 |
| 2015/0099411 A1 * | 4/2015 | Yang | B32B 7/12 |
| | | | 442/1 |

FOREIGN PATENT DOCUMENTS

| | | | | |
|---|---|---|---|---|
| DE | 102018205425 A1 * | 10/2019 | | G10K 11/161 |
| EP | 1780398 | 5/2007 | | |
| EP | 1416148 | 6/2009 | | |
| EP | 2602469 | 6/2013 | | |
| WO | WO-2008023941 A1 * | 2/2008 | | F02M 35/1216 |
| WO | WO2016005489 | 1/2016 | | |

* cited by examiner

INLINE HIGH FREQUENCY FIBER SILENCER

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/794,848, entitled "INLINE HIGH FREQUENCY FIBER SILENCER", filed Jan. 21, 2019, the contents of which is incorporated herein by reference.

FIELD OF THE INVENTION

The present invention relates generally to vehicle airflow systems and, more particularly, to a high frequency attenuating solution for an air flow system of a vehicle.

BACKGROUND OF THE INVENTION

Internal combustion engines with turbochargers commonly generate objectionable high frequency turbo hiss (on the clean side of the induction system) around 0.8-20 kHz. Hiss Noise Resonators or perforated silencers are typically utilized to attenuate between 0.8-4 kHz, which do not adequately attenuate higher frequencies.

Conventional hiss noise resonators leave an unaddressed turbocharger problem frequency range from 4-20 kHz, depending on the size and configuration of the turbocharger. Conventional resonators such as Helmholtz, expansion chamber and Quarter Wave Tuners (QWTs) cannot target such high frequencies. Prior art, such as that disclosed by WOCO [U.S. Pat. No. 6,802,388] and MAHLE [U.S. Pat. No. 7,631,726 B2] attempt to target higher frequencies and broader bandwidths; however, they fall significantly short of desired performance levels, while also being heavy and expensive.

U.S. Pat. No. 6,802,388 discloses a resonator which houses a specific number of QWTs to target each octave band. In order to target each octave band in the high frequency regime (>8.0 kHz), about 400 QWTs would be required. Even more QWT would be required in order to further enhance the performance within said octave band beyond minimally useful levels. Furthermore, additional valuable and difficult to obtain package space would be required in an attempt to further broaden the attenuation range by targeting multiple octave bands.

One problem with the prior art is that a larger sized in-line silencer may lead to a higher restriction penalty since the reactive silencing components are required to be placed directly in the path of maximum flow. Packaging space is also inadequate when trying to fit an in-line silencer targeting multiple octave bands in the high frequency regime because of limits imposed by available space and suitable duct lengths. Typical designs will also be limited by manufacturing feasibility when targeting above 12.0 kHz due to difficulties in forming such large numbers of closely spaced, short, and small diameter holes in solid, molded plastic components. The prior art, as noted above, tends to be very heavy, complex, and expensive. Accordingly, very few production examples of these technologies are used in practice, owing to their weight and cost to implement.

What is lacking in the industry is an affordable, packageable, lightweight, and easily manufactured broadband silencer that adequately addresses the vehicle manufacturers' requirements, especially in situations where intake air may become laden with oil droplets or condensing vapors from positive crankcase ventilation (PCV) systems, or the like, present on most gasoline fueled engines.

SUMMARY OF THE INVENTION

The current invention involves the use of specially manufactured fibrous mats or sheets, either singly or in combination, that are formed specifically to provide acoustic properties, structure, and stamped-in features designed to promote the following assembly steps, trimmed, rolled and/or folded, and bonded such that they produce a sufficiently rigid form to allow secure insertion into a housing that, together, will form a durable, broad-band, high-frequency, acoustic silencer. The fibrous mats, or combination of fibrous mats, which may also include films, loose fibrous particulate, foamed, or woven materials, are tuned to operate in whatever frequency ranges are desired.

A thermoformed fibrous sheet with a robust structure would provide similar attenuation performance, but would be more broadband in effect. The fibrous silencer is located as an in-line part inside the duct, but can be manufactured into a wide range of shapes, sizes, thicknesses, and configurations. The ability to attenuate high frequency (>8.0 kHz) using a dissipative approach for fibrous sheets leads to better broadband performance (for the same packaging space) when compared to the reactive tuning in the prior art. Dissipative is generally associated with absorption rather than reactive, wherein dissipative equates to absorptive.

The in-line fibrous silencer could also be combined with conventional perforated silencers or QWT panels to target the entire problem frequency range from 0.8-20.0 kHz.

Another objective of the invention is to simply and efficiently manufacture different configurations that are designed to minimize the pressure due to their presence. This is achieved by locating the fibrous absorbers at the most aerodynamically advantageous spot when compared to prior art, which requires placement directly in the path of maximum flow.

Another objective of the invention is the ability to manufacture constructions of varying composition, density, porosity, thickness and shape, which can be tuned to help target different attenuation bands.

Another objective of the invention is the ability to employ a formed fibrous sheet instead of a conventional resonator, which will help easily tune for high frequencies. This is possible by modifying the fiber length, denier, porosity, thickness, surface density and other material properties.

Another objective is the potential to include hydrocarbon adsorption/desorption properties into the fibrous mat, such as through inclusion of activated charcoal or other materials that will help reduce hydrocarbon loss to the atmosphere and related pollution.

Another objective is the potential to incorporate oleophobic materials or treatments into part of the composition to help resist engine oil contamination of the silencer in situations where such conditions might exist.

Another objective is the potential to incorporate oleophilic materials or treatments into part of the composition to help selectively remove oil contamination from acoustically sensitive areas of the silencer in situations where such conditions might exist.

Another objective of the invention is the ability to manufacture a cost-effective high frequency acoustic solution compared to prior art, that is more suitable for broad acceptance for high volume vehicle applications.

Another objective of the invention is the ability to manufacture different shapes that adapt easily for manufacturing feasibility. It is advantageous to manufacture lofted areas in certain spots to tune different octave bands or for a more robust fit inside the duct. Injection molding a frame with built-in quarter wave tuners onto the fibrous silencer would result in a hybrid solution incorporating quarter wave tuners to target a particular octave band in addition to the inherent broadband tuning capability of the primary invention.

Yet another objective of the current invention is to enable formed fibrous panels to be separated from a discrete housing and applied throughout the duct system as needed, for example, within the air cleaner assembly or simply installed into properly designed ducts.

Yet another objective of the invention is to teach a method by which the thermoformed mats may take on a self-reinforcing, multi-arched (lobed) configuration that, once installed into the housing, remains in a pre-strained form for optimal rigidity while offering maximum surface area, no sharp edges, a wide range of gently varying spaces between absorbing surfaces for optimal acoustic performance, and a means to keep the absorbing structure out of the maximum flow areas of the duct system for improved airflow resistance.

Another objective is the possibility of incorporating molded-in air deflectors and/or oil traps and drainage passages into the molded components to protect the silencer from exposure to oil droplet laden air flow.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Figure 1:
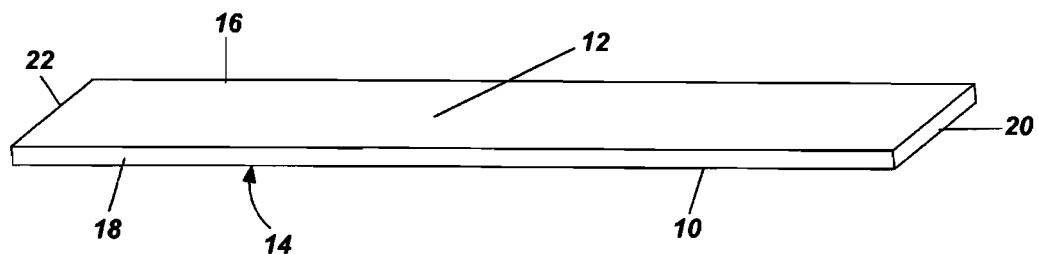
FIG. 1 is a perspective view of a blank fiber mat.

FIG. 1 is a generally rectangular blank of a preferably nonwoven fiber mat 10, perhaps as a combination of different mats, woven materials, films, or foam layers, with a total basis weight of about 800-1000 grams per square meter, selected to offer the required structural and acoustic properties once formed. A specifically chosen mat construction composed of fibers that could be selected from a range of organic, inorganic, synthetic, or naturally occurring fibers, or a blend thereof, that is capable of being formed through heat and pressure into a final shape that offers the desired acoustical and structural performance, is formed and trimmed from a blank, or blanks, of material optimized to allow shaping by thermoforming or compression molding into a targeted final form. The mat could be layered into a structure with gradients in density, composition, texture, or structure and could be the result of a combination of sub-mats layered together in total or in specific locations. The mat 10 would be further defined by a thickness (t1) with an upper surface 12, a lower surface 14, bounded by a first side edge 16, a second side edge 18, a proximal end 20 and a distal end 22.

Figure 2:
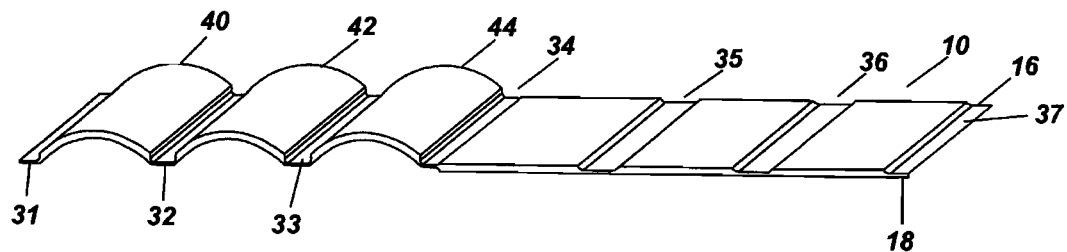
FIG. 2 is a perspective view of the mat shaped into a desired shape.
Figure 3:
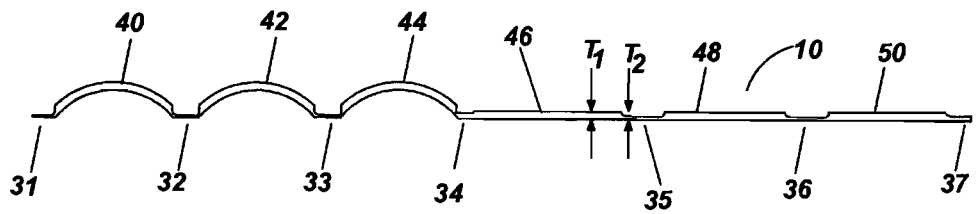
FIG. 3 is a side view of the mat.

FIGS. 2 and 3 are thermoformed blanks of the nonwoven mat 10 with local unconsolidated thicknesses ranging from nearly full thickness T1 with high porosity to fully consolidated thickness T2 and essentially nonporous, specifically profiled to facilitate shaping the thermoformed mat into a final desired shape. In the preferred embodiment, the distal end 22 of the mat 10 forms a first consolidated nesting location 31 leading to a first outer wall panel 40, a second consolidated nesting location 32 leading to a second outer wall panel 42, a third consolidated nesting location 33 leading to a third outer wall panel 44, a fourth consolidated nesting location 34 leading to a first inner wall panel 46, a fifth consolidated nesting location 35 leading to a second inner wall panel 48, a sixth consolidated nesting location 36 leading to a third inner wall panel 50, and a seventh consolidated nesting location 37. The first nesting area 31 combines with the seventh consolidated nesting area 37 to form a circular shape. The consolidated nesting locations formed by thermoforming or compression molding extend from the first side edge 16 to the second side edge 18.

Figure 4:
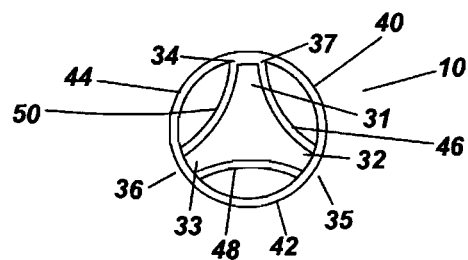
FIG. 4 is a side view of the mat rolled and tack-welded with matching areas nesting.

Referring to FIG. 4, the mat is then rolled or folded and heat staked, welded, glued, or otherwise bonded into an intermediate shape that allows its placement into a housing canister. Prior to rolling or folding the formed mat, the mat could be over-injection or compression molded with a support structure that incorporates additional tuning features, such as QWT arrays, for a wider performance envelope, while also offering structural rigidity and possible air and oil deflectors and oil drainage features to protect the fibrous silencer from oil contamination. The formed mat 10 is rolled and tack-welded with matching areas nesting as needed to maintain the desired shape and thickness, wherein the numbered locations are mated to other locations as indicated. Nesting location 31 couples to nesting locations 34 & 37, nesting location 32 couples to nesting location 35, and nesting location 33 couples to nesting location 36; which constitutes a double-roll configuration. Single roll configurations, as well as some with more than two, are possible under certain circumstances, are not illustrated. Partial roll configurations are also possible, depending on situation specific design and performance needs.

Figure 5:
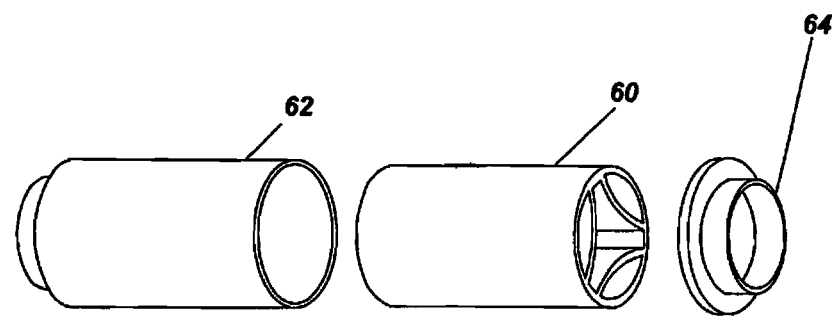
FIG. 5 is an exploded view of an in-line silencer.

FIG. 5 is a depiction of an assembled mat forming an in-line silencer 60 as a fibrous insert with an outer housing 62 and end closure 64 to complete the assembly. The outer housing 62 is preferably polymeric to further serve as a protective housing as required by the situation. In the preferred embodiment, due to cost and complexity, only an outer housing shell need be employed; however, a double-walled housing could be employed for acoustic benefit, which could be perforated for acoustic tuning purposes. This shell, once installed with a fibrous in-line silencer 60 and capped with the end closure 64, is sealed by welding, adhesives, or other robust method to ensure a completely leak proof seal. In an effort to manage possible contamination of the fibrous silencer, either the housing 62 or the end closure 64 could include molded-in or added-in air deflectors to steer oil droplet laden air away from impinging on the fibrous silencer. This completed silencer structure may furthermore be attached to appropriate duct portions to complete an assembled component as required by the vehicle manufacturer. The duct portions herein may be molded into the silencer housing, or otherwise added, and may incorporate features to allow for flexibility and adequate mounting. The silencer housing 62 and end closure 64 could themselves comprise a perforated or annular resonator assembly for additional acoustic tuning capability. In the preferred embodiment, a portion of the fibrous material includes oleophobic materials or coatings. Alternatively, a portion of the fibrous material includes oleophilic materials or coatings strategically incorporated within a generally oleophobic or oleo-neutral fibrous structure to selectively draw out oil retained therein. It is submitted that making a portion of the fibrous structure highly attractive to oil, it can actually draw any trapped oil out of the acoustically active portion of the fibrous silencer, thus protecting its function.

Figure 6:
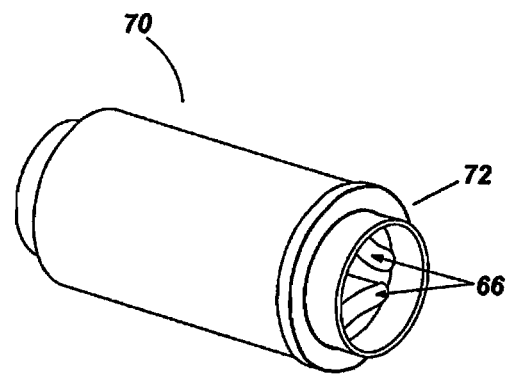
FIG. 6 is a perspective view of a silencer assembly.

FIG. 6 is a depiction of a completed silencer assembly 70 having an end closure 72 including air/oil deflectors 66. It is noted that additional air or oil deflectors, ducts, or secondary silencers may be added at either end.

Figure 7:
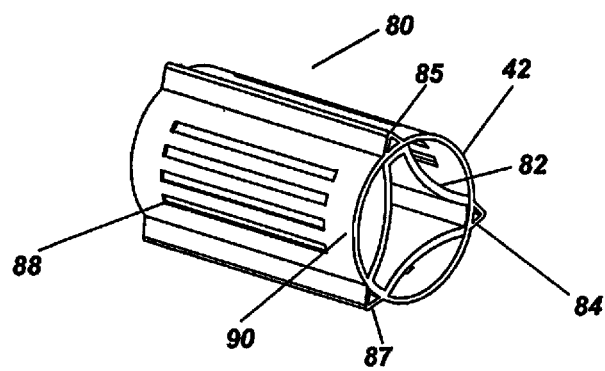
FIG. 7 is a perspective view of a thermoformed insert.
Figure 8:
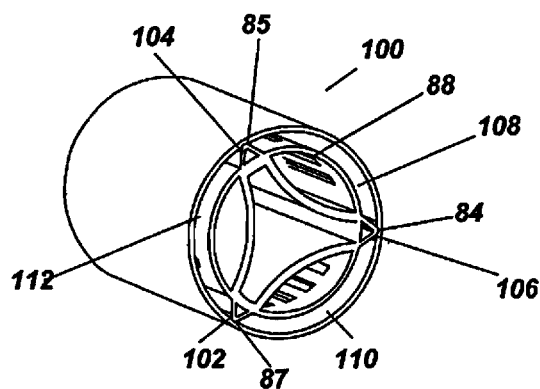
FIG. 8 is a perspective view of an insert with molded-in guides.

FIGS. 7 and 8 depict a thermoformed fibrous insert 80 embodiment having advanced features such as thicker inner walls 82, formed-in spacers 84, 85, and 87 to maintain an outer annulus volume 108 that could be packed with additional fibrous or foam materials for lower frequency tuning, with punched or cut communication slots or holes 88 formed in the outer wall 90 that could incorporate a thin separation screen of woven or nonwoven material, if needed, created in nearly fully consolidated outer walls 90. An outer housing 100 is depicted with the fibrous insert 80 positioned within the outer housing 100 having molded-in guides 102, 104, and 106 to secure the insert 80 in place and to isolate the potentially separately tuned annular volumes 108, 110, and 112. Furthermore, such advanced features could also include a twisted configuration or non-uniform cross-section down the length of the fibrous silencer insert 80 to provide more fiber mat face exposure to impinging sound waves while also imparting, or negating, a rotation to the flow, as needed, for peak duct flow efficiency.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A high frequency attenuating device for a vehicle air induction system comprising: a thermoformed or compression formed in-line silencer securable within said flow induction system formed from a mat of fibrous material with a total basis weight of about 800-1000 grams per square meter, said mat shaped into a double-roll configuration comprising a first consolidated nesting location leading to a first outer wall panel, a second consolidated nesting location leading to a second outer wall panel, a third consolidated nesting location leading to a third outer wall panel, a fourth consolidated nesting location leading to a first inner wall panel, a fifth consolidated nesting location leading to a second inner wall panel, a sixth consolidated nesting location leading to a third inner wall panel, and a seventh consolidated nesting adjoining said first consolidated nesting location, wherein said first nesting location couples to said fourth and said seventh nesting location, said second nesting location couples to said fifth nesting location, and said third nesting location couples to said sixth nesting location, arranging said mat into a circular shaped outer wall having a proximal end and a distal end with at least three inner panels extending therebetween, wherein said in-line silencer is constructed and arranged to attenuate high frequency by a dissipative approach.

2. The high frequency attenuating device according to claim 1 wherein said in-line silencer is tuned to target a high frequency by modifying physical and material properties of said fibrous material.

3. The high frequency attenuating device according to claim 1 wherein said in-line silencer is constructed and arranged to target octave bands.

4. The high frequency attenuating device according to claim 1 wherein said in-line silencer inner walls are in-line with the outer wall to minimize airflow restriction.

5. The high frequency attenuating device according to claim 1 including a housing for positioning of said in-line silencer.

6. The high frequency attenuating device according to claim Y, wherein said housing or end closure includes air deflectors for steering oil droplet laden air away from said fibrous material.

7. The high frequency attenuating device according to claim 1 including spacers formed in said outer wall along said first, second and third nesting locations, wherein said spacers centrally position said in-line silencer in said housing.

8. The high frequency attenuating device according to claim 1 wherein said in-line silencer is combined with a perforated silencer, annular resonator, QWT array, or a combination thereof to target attenuating frequency ranges.

9. The high frequency attenuating device according to claim 1 wherein said fibrous material provides hydrocarbon adsorption/desorption.

10. The high frequency attenuating device according to claim 1 wherein said fibrous material outer wall is perforated for acoustic tuning.

11. The high frequency attenuating device according to claim 1 wherein a portion of said fibrous material includes oleophobic materials or coatings.

12. The high frequency attenuating device according to claim 1 wherein a portion of said fibrous material includes oleophilic materials or coatings constructed and arranged to draw out oil retained therein.

* * * * *